United States Patent [19]
Folk et al.

[11] Patent Number: 5,560,466
[45] Date of Patent: Oct. 1, 1996

[54] SAFETY GUARD SYSTEM FOR MACHINE HAVING A RAM

[75] Inventors: Kenneth F. Folk, Harrisburg; Joseph M. Bowling, Carlisle, both of Pa.

[73] Assignee: The Whitaker Corporation, Wilmington, Del.

[21] Appl. No.: 414,476

[22] Filed: Mar. 31, 1995

[51] Int. Cl.⁶ ........................................................ F16P 3/16
[52] U.S. Cl. ...................... 192/130; 192/129 A; 192/134; 74/615; 100/53
[58] Field of Search .................................... 192/130, 133, 192/134, 129 A; 74/615; 100/53

[56] References Cited

U.S. PATENT DOCUMENTS

| | | | |
|---|---|---|---|
| 3,186,256 | 6/1965 | Reznick | 74/615 |
| 3,487,182 | 12/1969 | Grundy | 192/134 X |
| 3,939,314 | 2/1976 | Loeser | 192/134 X |
| 4,044,445 | 8/1977 | Douri | 192/134 X |
| 4,060,160 | 11/1977 | Lieber | 192/134 |
| 4,527,684 | 7/1985 | Eggeman et al. | 192/130 |
| 4,586,248 | 5/1986 | Ho | 29/708 |
| 4,698,905 | 10/1987 | Taga | 29/798 |

FOREIGN PATENT DOCUMENTS

| | | | |
|---|---|---|---|
| 2556516 | 6/1977 | Germany | 192/130 |
| 2144195 | 2/1985 | United Kingdom . | |

Primary Examiner—Richard M. Lorence

[57] ABSTRACT

A safety guard system provided for a machine having a ram which is movable toward and away from a work zone and an actuator which is operable for driving the ram through a ram stroke toward the work zone. The safety guard system includes a safety guard mounted for movement along a guard path between open and closed positions with respect to the work zone. The safety guard is releasably coupled to the ram for movement during the ram stroke from the open to the closed position before completion of the ram stroke, and the safety guard is arranged to decouple from the ram upon either one of reaching the closed position or earlier encountering an obstruction in the guard path. A guard sensor effects a first signal upon the safety guard reaching the closed position, and an object sensor effects a second signal upon decoupling of the safety guard from the ram. A controller is responsive to the first and second signals such that the controller enables completion of the ram stroke upon receiving the first signal, and the controller terminates the ram stroke upon receiving the second signal prior to receiving the first signal.

7 Claims, 8 Drawing Sheets

SAFETY GUARD SYSTEM FOR MACHINE HAVING A RAM

FIELD OF THE INVENTION

The invention relates to the field of safety guards for power driven machines, and in particular, to a movable safety guard which improves access to the workstation of the machine between work cycles.

BACKGROUND OF THE INVENTION

Safety guards or barriers which shield the moving parts of a machine in order to prevent accidental injury are well known. A problem with safety guards is that they restrict essential access to the workstation of the machine such as is necessary for an operator to properly and efficiently position a workpiece in the workstation, thereby frustrating the operator and reducing production rates. For a non-continuous duty cycle machine of the type which is cycled only upon receiving a signal initiated by the operator, it is advantageous to have a movable safety guard which is open during periods between machine cycles to allow better access to the workstation, but which closes when the operator cycles the machine. Still, since the movable safety guard must close before a critical machine operation can occur, machine cycle time is increased and production rates are reduced. Further, since some operators want to hold on to a part of the workpiece in the vicinity of the safety guard, there is a tendency for operators to defeat the safety guard such as by binding it in the open position. Even so, continuing efforts to improve worker safety are resulting in ever more restrictive safety guards.

U.S. Pat. No. 4,060,160 to Lieber discloses a safety guard which is mounted to move with the ram of a machine. A safety interlock ensures that if a foreign object is encountered by the guard, machine operation will be terminated. The interlock utilizes the safety guard as a workpiece sensor and relies on a material property of the workpiece not normally exhibited by a body part, such as electrical conductivity. If the safety guard encounters an object without concurrently sensing the expected material property, power to the ram is cut off. There are a number of problems with this arrangement. A specific material property of the workpiece must be selected to be sensed, thereby requiring a sensor which is dedicated to the selected material property. Also, the interlock may need to be customized with different sensors for different material properties of different workpieces. Further, some workpieces may not readily lend themselves to being sensed through the safety guard. For example, an insulated electrical conductor which is to have a terminal applied to a crimped end thereof is not readily differentiated from a foreign object based on a material property. There is a need for a movable safety guard with a simple interlock system to ensure that the guard has closed prior to an operation being performed on a workpiece.

SUMMARY OF THE INVENTION

The invention provides a safety guard system for a machine having a ram which is movable toward and away from a work zone and an actuator operable for driving the ram through a ram stroke toward the work zone. The safety guard system includes a safety guard mounted for movement along a guard path between open and closed positions with respect to the work zone. The safety guard is releasably coupled to the ram for movement during the ram stroke from the open to the closed position before completion of the ram stroke, and the safety guard is arranged to decouple from the ram upon either one of reaching the closed position or earlier encountering an obstruction in the guard path. A guard sensor effects a first signal upon the safety guard reaching the closed position, and an object sensor effects a second signal upon decoupling of the safety guard from the ram. A controller is responsive to the first and second signals such that the controller enables completion of the ram stroke upon receiving the first signal, and the controller terminates the ram stroke upon receiving the second signal prior to receiving the first signal.

BRIEF DESCRIPTION OF THE DRAWINGS

The invention will now be described by way of example with reference to the accompanying drawings in which like elements in different figures thereof are identified by the same reference numeral and wherein.

DETAILED DESCRIPTION OF THE PREFERRED EMBODIMENT

Figure 1:
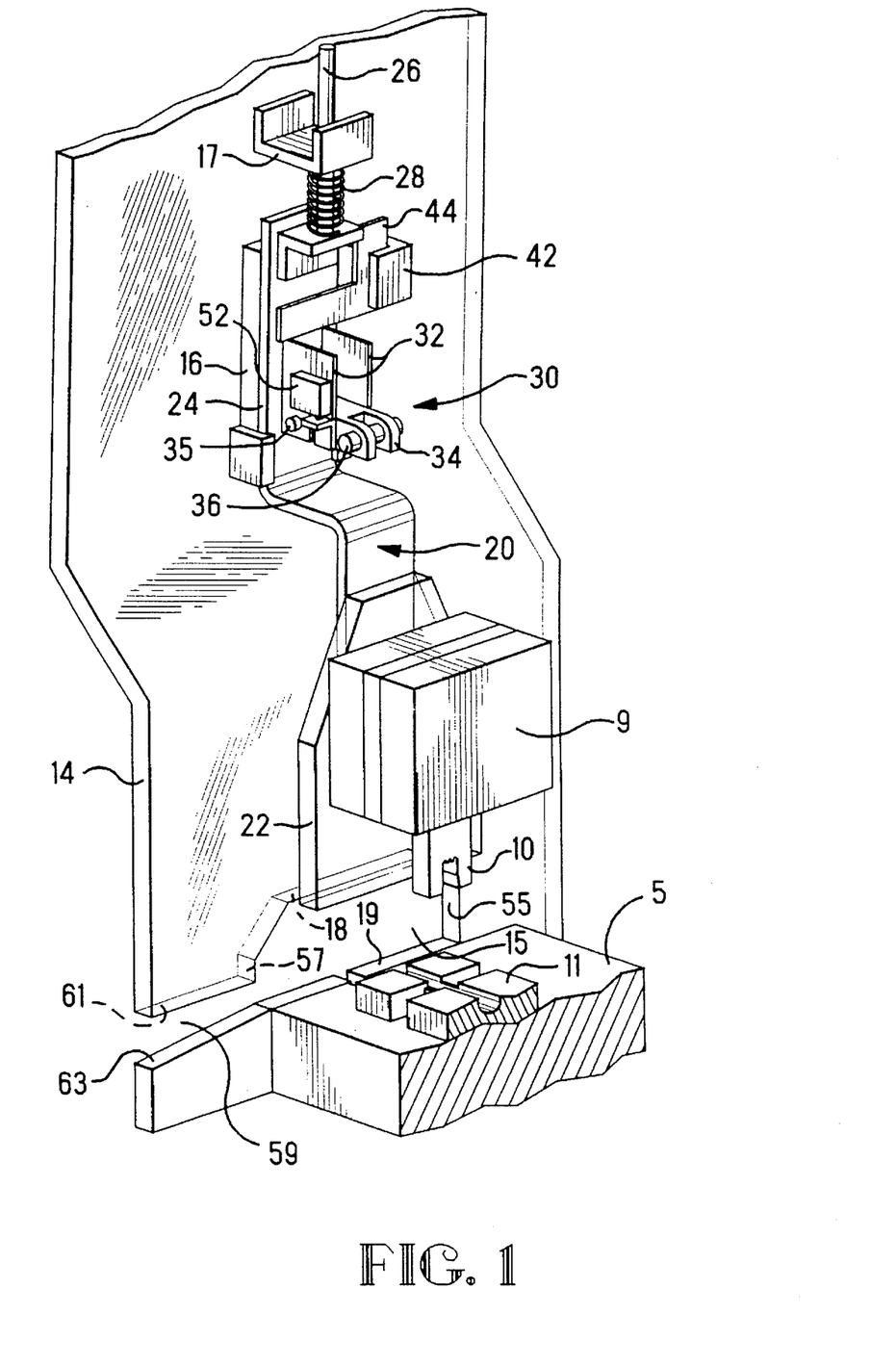
FIG. 1 is a perspective view of a safety guard system according to the invention in association with a machine ram.
Figure 2:
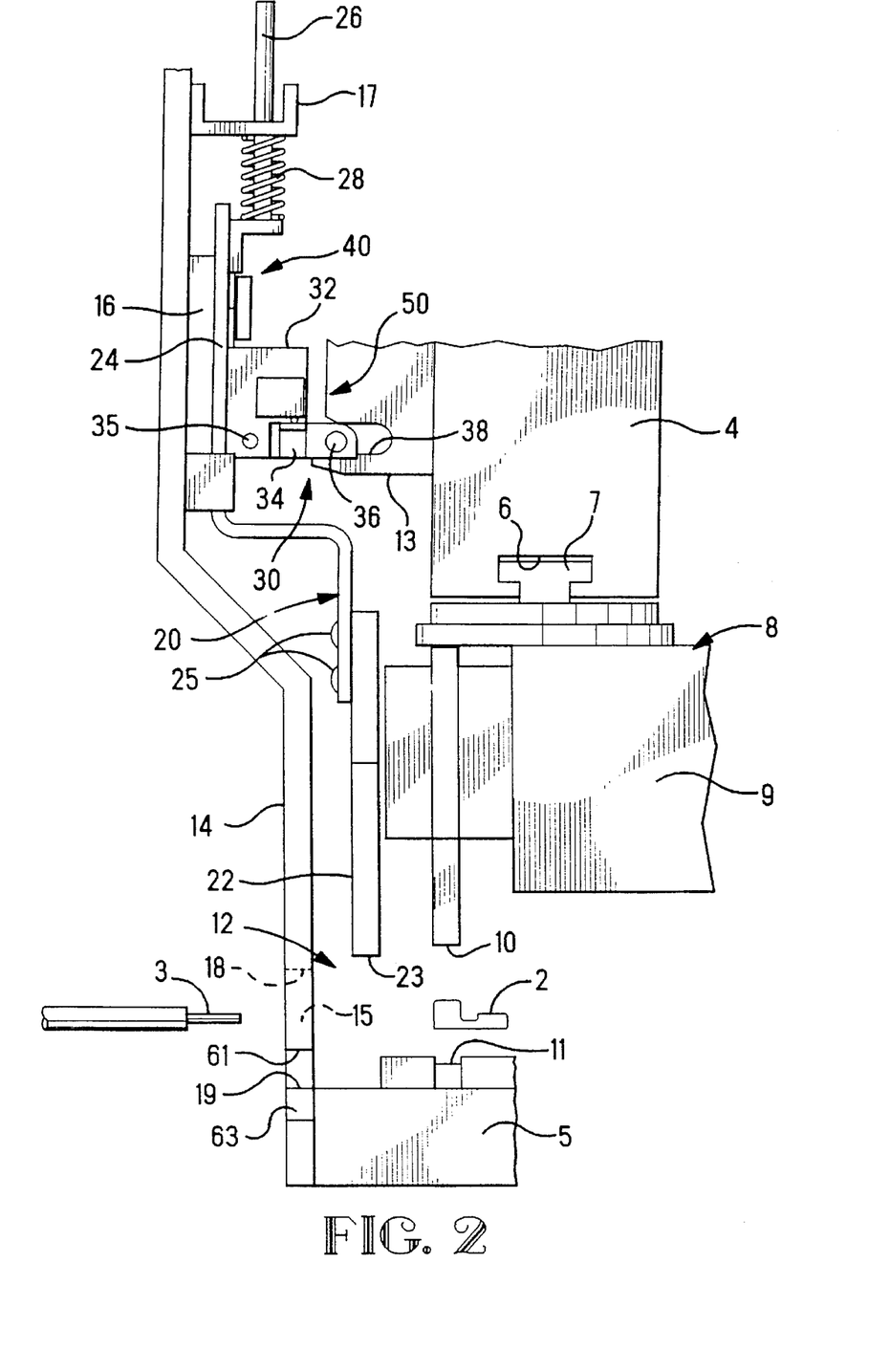
FIG. 2 is a side elevation view of the safety guard system.

With reference to FIGS. 1 and 2, a safety guard system according to the invention is shown in association with relevant portions of a terminal crimping machine which is operable for deforming a terminal 2 onto the end of a wire 3, although the safety guard system can be utilized on numerous other machines which have a ram movable through a ram stroke. The terminal crimping machine has a press ram 4 which is mounted for reciprocation with respect to a base 5. The press ram 4 is driven downwardly through a ram stroke by an actuator such as an electric motor (not shown) upon generation of an appropriate start signal which is typically initiated through a foot switch controlled by the machine operator. The press ram 4 has a slot 6 which receives a knob 7 of a terminal applicator shown generally as 8. The terminal applicator 8 includes an applicator ram 9 which carries an upper crimping die 10 which cooperates with a lower crimping die, or anvil, 11 to deform the terminal 2 tightly around the wire 3. The terminal applicator 8 receives terminals in strip form from a supply and automatically severs an individual terminal from the strip and feeds the severed terminal 2 to a work zone 12 above the anvil 11 with each cycle of the press ram 4. A complete description of such a terminal applicator 8 is contained in U.S. Pat. No. 3,184,950 which is incorporated by reference as if set forth fully herein.

Safety and noise considerations dictate that the terminal crimping machine be substantially surrounded by an enclosure. The enclosure is preferably made from a clear polycarbonate plastic material. A section 14 of the enclosure is mounted on a hinge (not shown) to permit pivoting of the enclosure section 14 and thereby provide access to the machine for service during intervals between crimping cycles. An appropriate interlock may be provided to prevent cycling the machine when the enclosure section 14 is open. A window 15 defined by a cutout in the enclosure section 14 provides an opening through which the wire 3 may be introduced to the work zone 12 by the machine operator, who then generates the start signal to actuate the ram.

Figure 3:
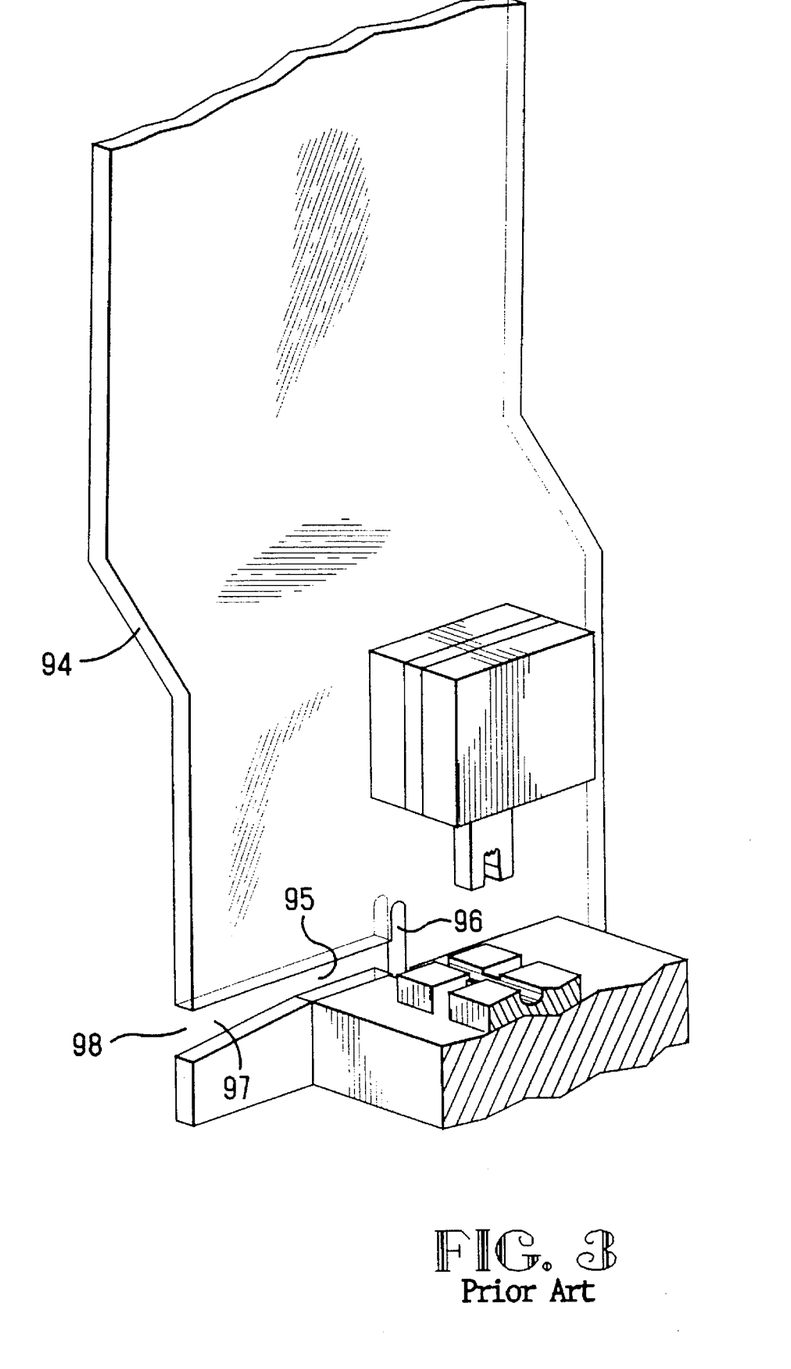
FIG. 3 is a perspective view of a prior art machine without the safety guard system.

A prior art crimping machine without the safety guard of the present invention is shown in FIG. 3 with an enclosure section 94 having a window 95. Safety considerations dictate that the window 95 be dimensioned quite narrow to preclude any body part, including a finger, from being inserted into the work zone through the window. The window 95 includes a vertical section 96 and a horizontal slot 97 which extends to an exit 98 at a side edge of the enclosure section. Typically the vertical section 96 has a width of approximately 0.25 inch (6.35 mm), and the portion of the slot 97 immediately adjacent to the vertical section has a height of similar dimension. Experienced machine operators prefer to hold a group of wires in one hand and to sweep individual wires into the work zone for crimping in quick succession while withdrawing the crimped wires through the exit 98 with the other hand. The configuration and dimensions of the window 95 hinder the operator from sweeping the wires through the machine at a rapid pace, thereby slowing production rates. This leads to operator frustration and causes operators to remove or alter the enclosure.

For a machine with the safety guard system of the present invention, the cutout can be significantly larger than would otherwise be acceptable because the safety guard system ensures that a foreign object in the work zone will be sensed and the crimping cycle will be halted before an injury can occur. Referring back to FIG. 1, the window 15 may now be approximately one inch high from upper edge 18 to lower edge 19, and approximately four inches wide from side edge 55 to side edge 57, thus permitting the machine operator to sweep and maneuver the wires through the work zone at a rapid rate, and to withdraw the wires through passageway 59 between sides 61 and 63.

With reference to FIGS. 1 and 2, the invention comprises a safety guard shown generally as 20 which includes a shutter section 22 and a slide section 24. The shutter section 22 is preferably made from a clear plastic material while the slide section 24 is preferably formed from a metal strip material. The shutter section 22 and the slide section 24 are coupled together such as by threaded fasteners 25 for movement as an integral safety guard unit. The slide section 24 is guided for vertical movement along a roller bearing slide 16 which is attached to the enclosure section 14. A rod 26 attached at an upper end of the slide section 24 is slidable within a hole in a bracket 17 which is fixed to the enclosure section 14. The safety guard 20 is biased downwardly by a spring 28 disposed over the rod 26 between the bracket 17 and the slide section 24.

Figure 4:
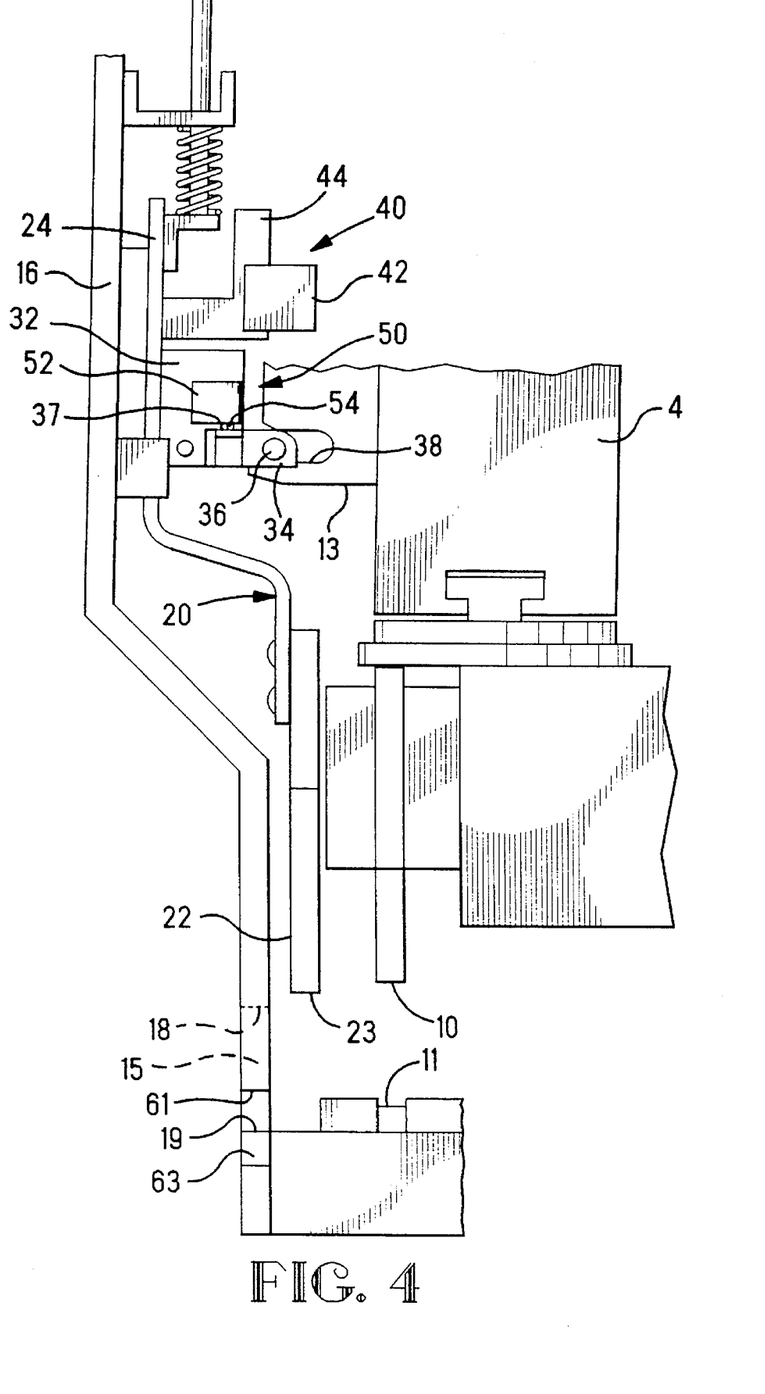
FIG. 4 is a side elevation view of the ram at the beginning of a ram stroke and the safety guard in an open position.
Figure 5:
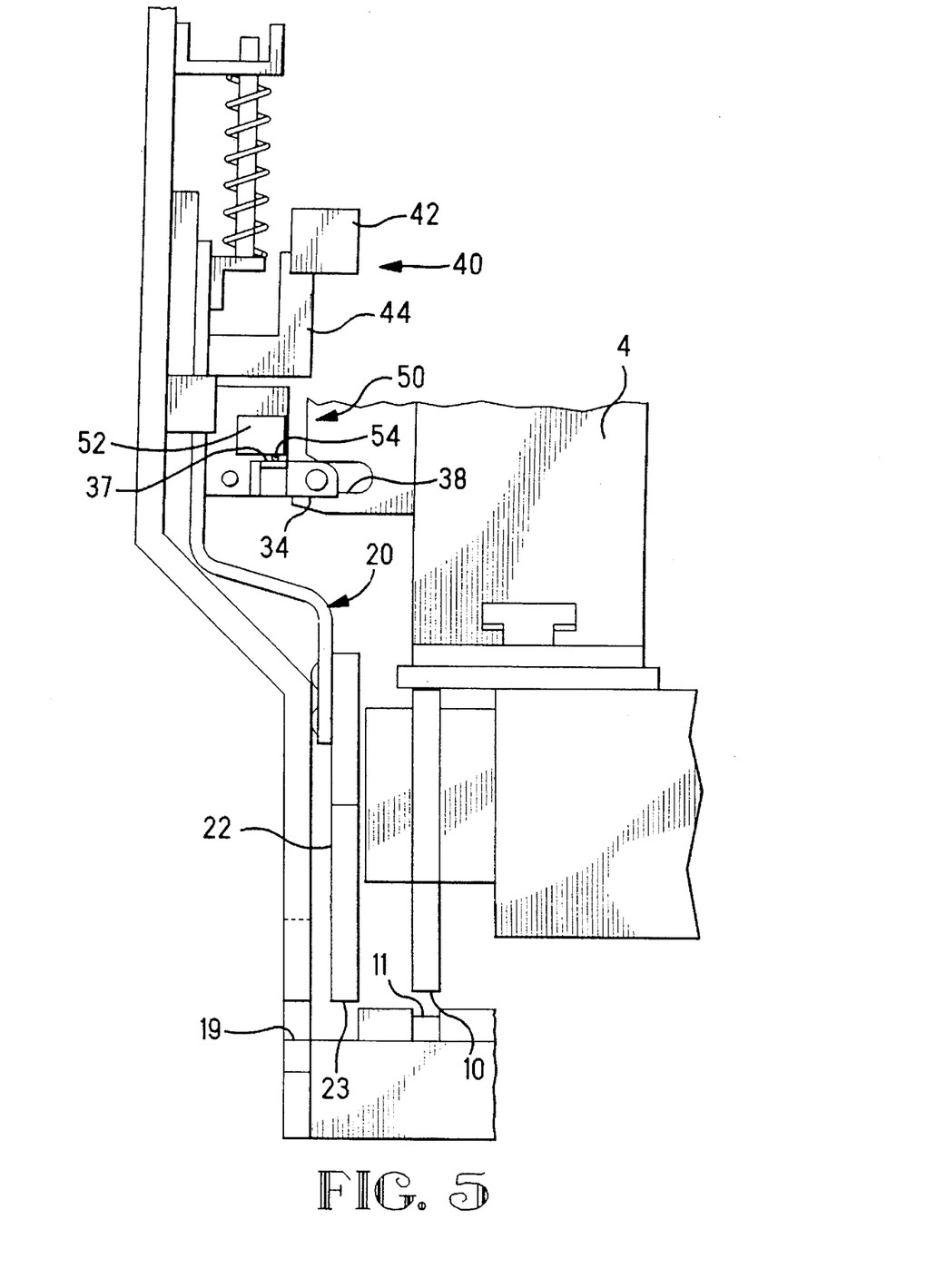
FIG. 5 is a side elevation view of the ram partially descended and the safety guard in a closed position.

A releasable coupling 30 provides a connection between the safety guard 20 and the press ram 4. The releasable coupling 30 includes a link 34 having one end that is pivotably mounted on a pin 35 which extends between and is held in a pair of opposed flanges 32 fixed to the slide section 24. The other end of the link 34 carries a pin 36 which is receivable in a cutout 38 formed in a block 13 attached to the press ram 4. A torsion spring (not shown) is arranged to bias the link 34 in a counterclockwise direction. The releasable coupling 30 enables the ram 4 to carry the safety guard 20 between an open position with respect to the work zone 12 as shown in FIGS. 2 and 4, and a closed position with respect to the work zone as shown in FIG. 5. The closed position is set by a stop connected to the roller bearing slide 16 which limits the downward movement of the safety guard. When the safety guard reaches the closed position, the safety guard decouples from the press ram which continues downward through a crimping stroke, as will be more fully described below.

When the safety guard 20 is in the open position shown in FIGS. 2 and 4, a bottom edge 23 of the shutter section 22 is disposed level with or relatively higher than the upper edge 18 of the window 15, thereby providing access through the full area of the window 15 to the work zone 12. When the safety guard is in the closed position shown in FIG. 5, a gap remains between the bottom edge 23 and the lower edge 19 of the window so that a wire that is being crimped is not engaged by the bottom edge 23.

Figure 8:
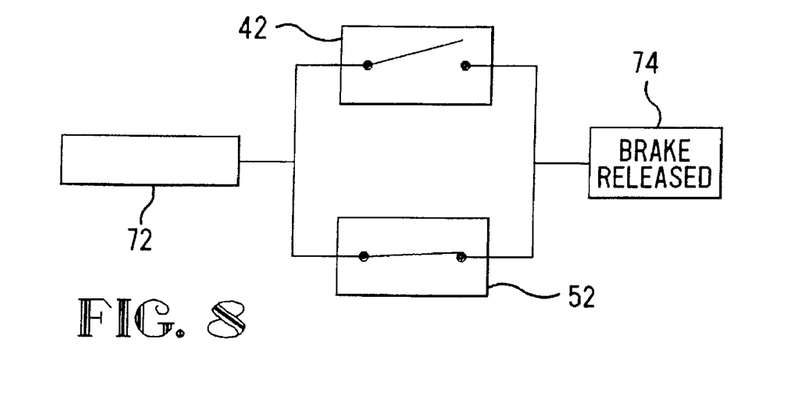
FIGS. 8–10 are schematic representations of a switching and control system during different stages of operation of the safety guard system.
Figure 9:
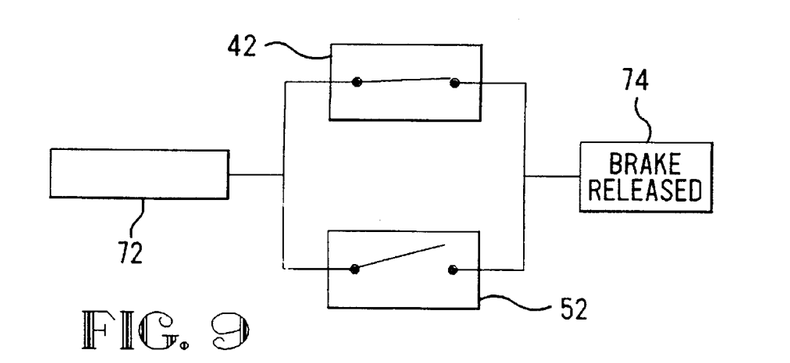
Figure 10:
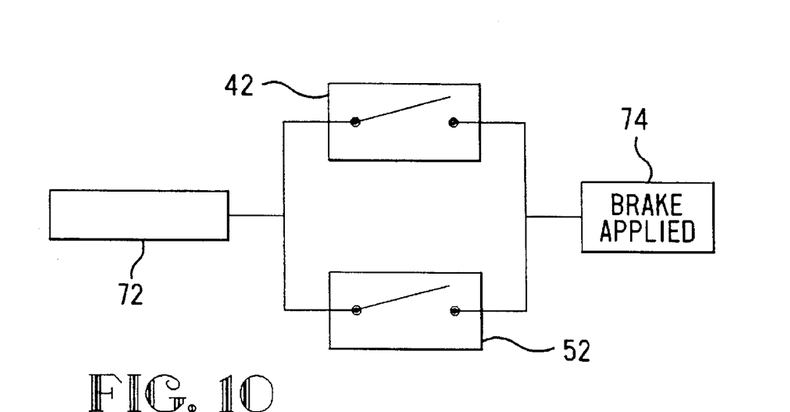

A guard sensor 40 effects a first signal when the safety guard 20 reaches the closed position. The guard sensor 40 may be, for example, a Hall effect switch 42 fixed to the enclosure section 14 which senses the presence or absence in the switch of a metal plate member 44 which is attached to the slide section 14 for movement with the safety guard 20. For clarity in FIGS. 4–7, the switch 42 and the plate member 44 are illustrated in an orientation which is rotated ninety degrees on a vertical axis from their preferred orientation. The switch 42 is coupled in an electrical circuit, shown schematically in FIGS. 8–10, between an electrical power source 72 and a controller 74 which is operable to terminate the ram stroke. The controller 74 preferably includes a brake and an application and release mechanism such as a solenoid. The brake is normally on, i.e., movement of the press ram 4 is prevented by the brake unless the solenoid is energized to release the brake, thereby providing a fail safe brake system. The normally closed switch 42 is tripped open when the plate member 44 is in the switch, which situation exists throughout the range of movement of the safety guard 20 from the open position shown in FIG. 4 to nearly the closed position shown in FIG. 5. When the safety guard 20 reaches the closed position shown in FIG. 5, the switch 42 closes as the plate member 44 exits the switch, thereby effecting the first signal which energizes the controller to release the brake.

Figure 6:
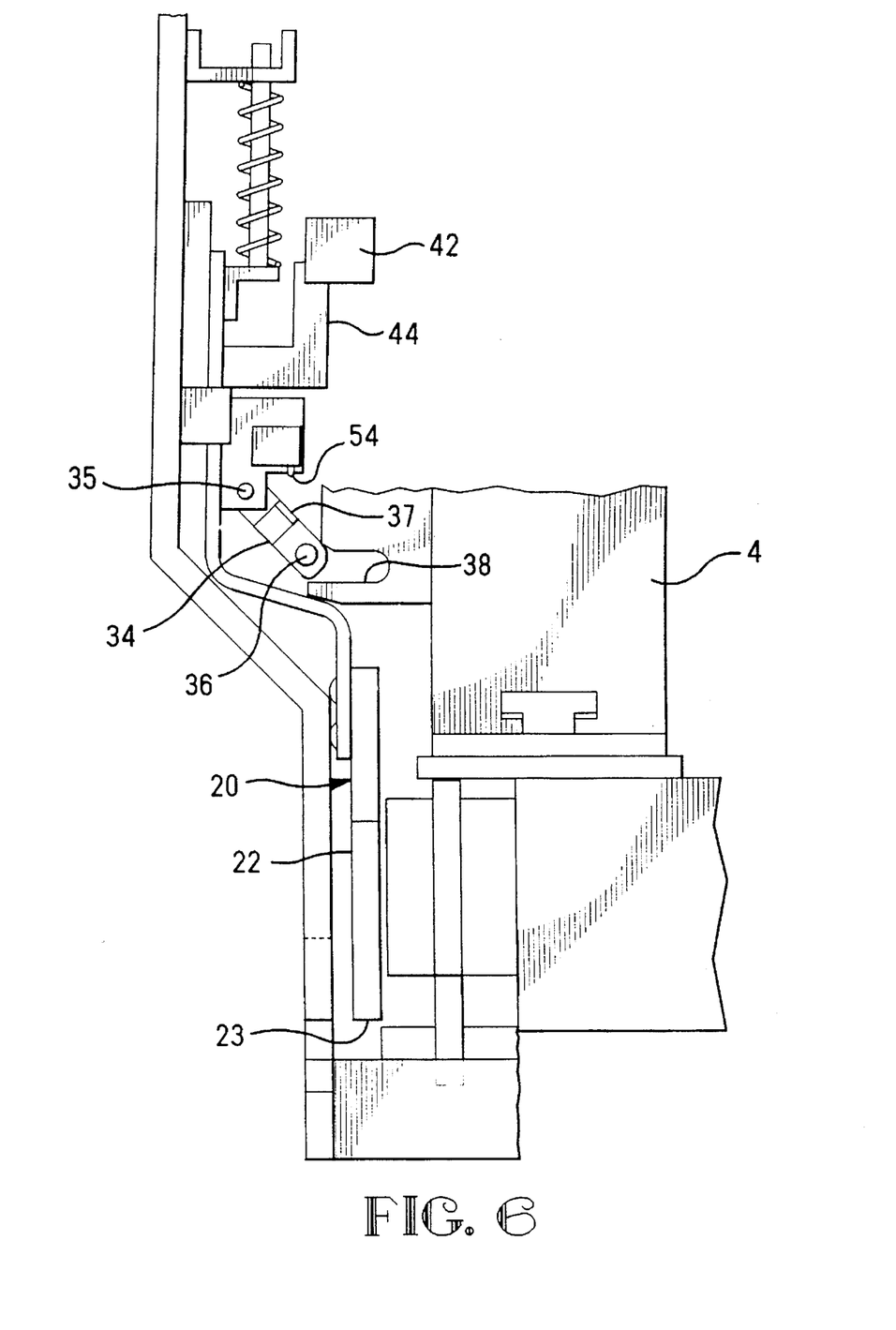
FIG. 6 is a side elevation view of the ram fully descended afar having decoupled from the safety guard.

An object sensor 50 effects a second signal when the safety guard 20 decouples from the press ram 4. The object sensor 50 may be a contact switch 52 having a trigger 54 which is engaged by a pad 37 attached to the link 34 when the link is in a horizontal position. The switch 52 is normally open and is wired parallel to the switch 42 in the circuit for the controller. The switch 52 is closed whenever the safety guard is coupled to the press ram due to the pad 37 engaging the trigger 54, thereby energizing the controller so as to maintain the brake released when the safety guard is in the open position prior to initiation of a ram stroke. This state is shown schematically in FIG. 8. During a ram stroke, the safety guard is driven to the closed position shown in FIG. 5, and the switch 42 closes. Continued downward movement of the press ram 4 causes pivoting of the link 34 which disengages the pad 37 from trigger 54, as shown in FIG. 6, thereby opening the switch 52 and effecting the second signal. The state of the switches 42 and 52 is shown schematically in FIG. 9. The second signal is an interruption in power from the source 72, and this would normally deenergize the controller 74 and permit the brake to apply. However, since the safety guard has already reached the closed position, the switch 42 has effected the first signal which energizes the controller and maintains the brake released. Once the safety guard reaches the closed position, completion of the ram stroke is enabled by the first signal regardless of the second signal.

Figure 7:
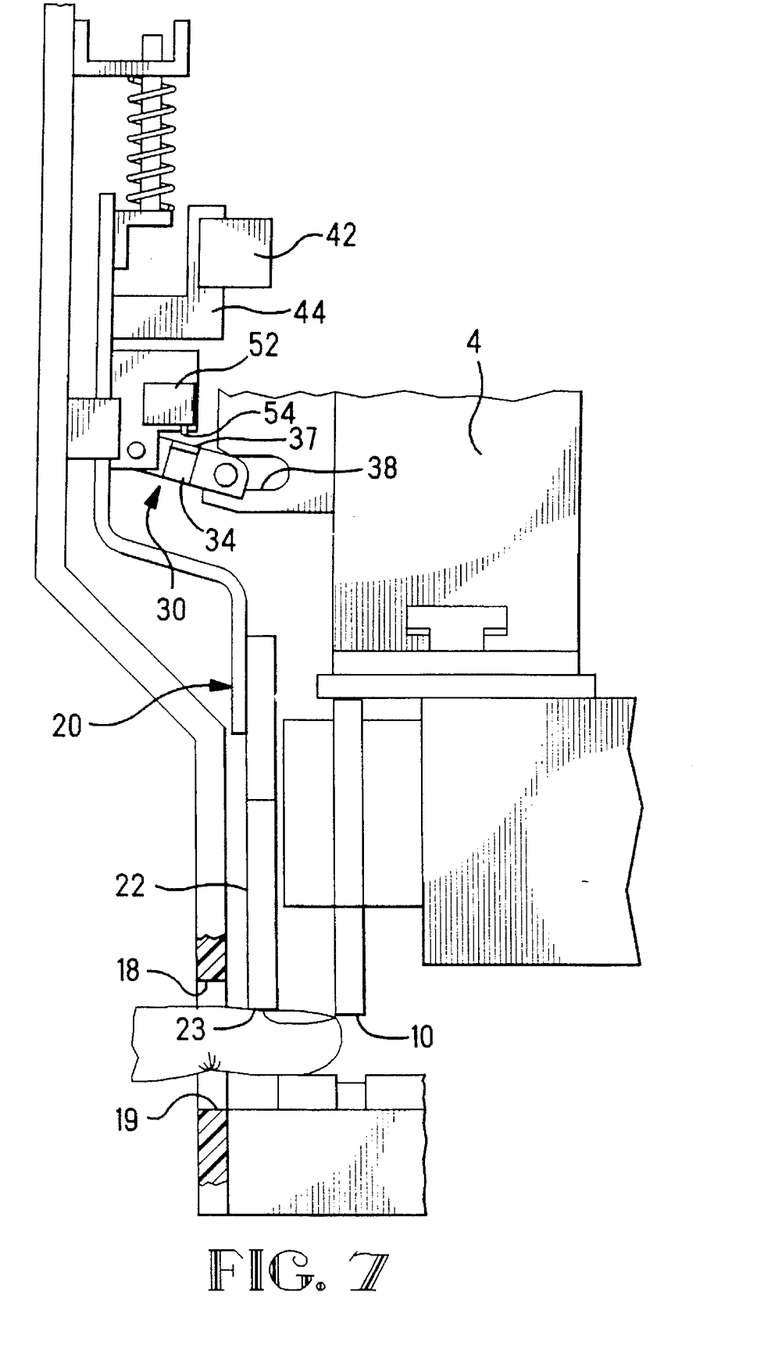
FIG. 7 illustrates the ram decoupling from the safety guard the safety guard meets an obstruction.

FIG. 7 illustrates what happens when a finger or other obstruction is inserted into the work zone during a ram stroke. As the safety guard 20 is driven down by the ram 4, the bottom edge 23 of the shutter section 22 engages the obstruction before the safety guard reaches the fully closed position. Due to the releasable coupling 30, the safety guard decouples from the ram without inflicting any injury to the body part. During the decoupling, the link 34 is pivoted clockwise, thereby disengaging the trigger 54 so as to effect the second signal. Since the safety guard has not reached the closed position, the plate member 44 is in the switch 42, and the first signal has not been effected. This state is shown schematically in FIG. 10. Upon receiving the second signal prior to receiving the first signal, the controller 74 is deenergized and the brake is applied, thereby terminating the ram stroke and stopping the ram before serious injury is inflicted on the body part.

The invention provides a safety guard system that permits increased access to the work zone of a machine during time periods when the machine ram is remote from the work zone. The system includes a movable safety guard that closes during a stroke of the ram toward the work zone, and a control system which is operable to terminate the ram stroke if the safety guard is held open by an obstruction.

The invention having been disclosed, a number of variations will now become apparent to those skilled in the art. Whereas the invention is intended to encompass the foregoing preferred embodiments as well as a reasonable range of equivalents, reference should be made to the appended claims rather than the foregoing discussion of examples, in order to assess the scope of the invention in which exclusive rights are claimed.

We claim:

1. In a machine having a ram movable toward and away from a work zone, and an actuator operable for driving the ram through a ram stroke toward the work zone, a safety guard system comprising:

a safety guard mounted for movement along a guard path between open and closed positions with respect to the work zone, the safety guard being releasably coupled to the ram so that movement of the ram during the ram stroke causes movement of the safety guard from the open position to the closed position before completion of the ram stroke, the safety guard being arranged to decouple from the ram upon either one of reaching the closed position or earlier encountering an obstruction in the guard path;

a guard sensor which effects a first signal upon the safety guard reaching the closed position;

an object sensor which effects a second signal upon decoupling of the safety guard from the ram; and, a controller responsive to the first and second signals such that the controller enables completion of the ram stroke upon receiving the first signal, and the controller terminates the ram stroke upon receiving the second signal prior to receiving the first signal.

2. The machine according to claim 1, wherein the safety guard is coupled to the ram by only a single pivotable link.

3. The machine according to claim 2, wherein the pivotable link has one end pivotally attached to the safety guard and an other end which is arranged to nest in a cutout formed in the ram such that the link will pivot and the other end will ride out of the cutout to effect the decoupling.

4. The machine according to claim 3, wherein the object sensor is a switch which is actuated by pivoting of the link.

5. The machine according to claim 1, wherein the controller includes a brake which is operable to stop the ram.

6. The machine according to claim 5, wherein the brake is normally applied so as to prevent movement of the ram, and further comprising a source of power and means for transmitting the power to the brake, the power being effective to release the brake and enable movement of the ram.

7. The machine according to claim 6, wherein the means for transmitting includes the guard sensor and the object sensor coupled in respective parallel branches of a power transmission network, the guard sensor being effective to interrupt the power to the brake through one of the branches unless the safety guard is in the closed position, and the object sensor being effective to interrupt the power to the brake through the other of the branches upon decoupling of the safety guard from the ram.

* * * * *